United States Patent [19]
Chen et al.

[11] Patent Number: 5,819,030
[45] Date of Patent: Oct. 6, 1998

[54] SYSTEM AND METHOD FOR CONFIGURING A SERVER COMPUTER FOR OPTIMAL PERFORMANCE FOR A PARTICULAR SERVER TYPE

[75] Inventors: John Yun-Kuang Chen, Seattle; Eric N. Lockard, Redmond; Darren A. Shakib, Redmond; Daniel R. Weisman, Redmond, all of Wash.

[73] Assignee: Microsoft Corporation, Redmond, Wash.

[21] Appl. No.: 674,891

[22] Filed: Jul. 3, 1996

[51] Int. Cl.[6] .................................................. G06F 15/177
[52] U.S. Cl. ..................... 395/200.5; 707/205; 711/170; 711/173; 395/200.56
[58] Field of Search ........................... 707/205; 711/170, 711/173; 395/876, 200.5, 200.56

[56] References Cited

U.S. PATENT DOCUMENTS

| | | | |
|---|---|---|---|
| 5,210,860 | 5/1993 | Pfeffer et al. ....................... | 395/183.18 |
| 5,218,699 | 6/1993 | Brandle et al. ..................... | 395/650 |
| 5,247,676 | 9/1993 | Ozur et al. ......................... | 395/650 |
| 5,283,856 | 2/1994 | Gross et al. ........................ | 395/51 |
| 5,333,311 | 7/1994 | Wipple, II. ......................... | 707/205 |
| 5,423,046 | 6/1995 | Nunnelley et al. ................. | 395/750.07 |
| 5,537,542 | 7/1996 | Eilert et al. ........................ | 395/200.31 |
| 5,640,595 | 6/1997 | Baugher et al. .................... | 395/830 |
| 5,666,538 | 9/1997 | DeNicola ............................ | 395/750.03 |

OTHER PUBLICATIONS

Shirley, John and Rosenberry, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

*Primary Examiner*—Kenneth S. Kim
*Attorney, Agent, or Firm*—Workman Nydegger Seeley

[57] ABSTRACT

A technique for configuring a server computer using an optimizer program to achieve optimal performance of the server based on the server types supported by the server. Configuration may involve both calculating server configuration parameters and deciding where to place various files used by the server. In order to decide where to place files, the hardware and software characteristics of the server disk drives are analyzed, and a performance table is generated. The disk drive performance data is then input into a series of algorithms of varying complexity to determine the drives where database files should be stored. Information regarding server utilization, the number of host users and the number of users in the organization is received from an administrator. The administrator input is used to calculate configuration parameters. The optimizer program may automatically adjust a plurality of registry parameters, and may automatically move one or more database and log files to the appropriate disk drives. Alternately, the administrator may be prompted to authorize the changes. The optimizer program may also save the changed parameters and locations to a registry log file.

20 Claims, 8 Drawing Sheets

| Number of Users on Server | MDB Minimum Threads | MDB Maximum Threads | DSA Maximum Threads |
|---|---|---|---|
| 25 | 3 | 5 | 50 |
| 50 | 5 | 10 | 50 |
| 100 | 5 | 15 | 50 |
| 250 | 10 | 25 | 50 |
| 500 | 10 | 50 | 50 |
| 1000 | 10 | 100 | 50 |

| Parameter | Single Server | Multi-Server |
|---|---|---|
| MDB users | * | * |
| Concurrent connections to LAN-MTAs | 10 | 40 |
| Concurrent connections to RAS LAN-MTAs | 2 | 10 |
| LAN-MTAs | 4 | 20 |
| X.400 gateways | 4 | 20 |
| XAPI MA threads | 1 | 1/2** |
| XAPI MA queue threads | 1 | 1/2** |
| XAPI MT threads | 1 | 1 |
| XAPI queue threads | 1 | 1 |
| ds_read cache latency (secs) | 3600 | 60 |
| Dispatcher threads | 2 | 1/2 |
| Transfer threads | 2 | 1/2 |
| Kernel threads | 1 | 3 |
| Submit/deliver threads | 1 | 1/2** |
| Number of RAS LAN-MTAs | 0 | 10 |
| DB Data buffer per object | 2 | 3/6*** |
| DB file handles | 32 | 192 |
| DB filecount delete threshold | 0 | 0 |
| DB file size delete threshold | 0 | 0 |
| RTS threads | 1 | 3 |

*number of users is same as cUsers used in database engine calculations.
** first number is with 32MB of RAM or less, second number is with greater than 32MB of RAM.
*** first number is with 64MB of RAM or less, second number is with greater than 64MB of RAM.

FIG. 3B

| Parameter | Value |
|---|---|
| MDB Max Buffers | * |
| DSA Max Buffers | * |
| MDB Minimum Threads | + |
| MDB Maximum Threads | + |
| DSA Maximum Threads | + |
| Maximum Cached Categorizations | min. (200, cUsers)** |
| Maximum Cached Restrictions | min. (200, cUsers)** |
| Private MDB Send Threads | 2 |
| Private MDB Delivery Threads | 2 |
| Public MDB Send Threads | 2 |
| Public MDB Delivery Threads | 2 |

\* Calculated values.
\+ Value from table of Fig. 3A.
\*\* Value is the number of users in cUsers or 200, whichever is less.

FIG. 3C

| File Name | Current Drive | Recommended New Drive |
|---|---|---|
| Private information store database | C: | D: |
| Public information store database | C: | H: |
| Information store log files | E: | F: |
| Directory service database | D: | E: |
| Directory service log files | D: | G: |
| Message transfer agent log files | F: | C: |
| Save new drive assignments and update parameters? | | Yes |
| Assign drives manually? | | |

FIG. 5A ated during
SYSTEM AND METHOD FOR CONFIGURING A SERVER COMPUTER FOR OPTIMAL PERFORMANCE FOR A PARTICULAR SERVER TYPE

BACKGROUND OF THE INVENTION

The invention generally relates to optimizing the performance of a server computer.

A client/server environment includes a combination of a client, or front end portion that interacts with a user, and a server, or back end portion that interacts with shared resources. A client program typically sends a message to a server program requesting the server to perform a task. The server program fulfills the request by retrieving database files, updating database files and/or otherwise responding to the client request. A process is an application that may be run by the server for a client, such as a word processing program or a spreadsheet program. A thread is a sub-component of execution within a process which permits multi-tasking within an application. For example, in a word processing program a user may be typing in one thread and running a spell check in another thread.

The server program may reside and execute on a separate machine in a network. For example, if the server computer is the host operating system or network file server, then it provides file system services and application services for many users. Further, the server computer may manage shared resources such as databases, printers or communication links.

Server programs run on a hardware platform appropriate for its function. For example, a database management system server will run on a platform specially designed and configured to perform queries, whereas a file server will run on a platform with special elements for managing files.

Typically, when a computer is initialized as a server machine, default values for certain software parameters are loaded, and database files and log files are assigned to the disk drives. However, client/server networks, and the roles the servers play in them, have become increasingly complicated. For example, in a client/server messaging system, a computer can be configured to perform as a private store server, public store server, connector/directory import server and/or a multi-server. A private store server stores user mailboxes. A public store server stores public folders and/or replicas of public folders stored on other servers. A connector or backbone server connects two or more servers together and merely permits messages to pass through. A computer configured as a multi-server connects to clients and to other servers.

Since each type of server configuration utilizes hardware and software resources in different ways, the default parameters and database file configurations that are loaded during set-up are almost certain to be inadequate. In many cases, use of the default values results in poor server performance, and in some cases results in a server that fails to function at all. Therefore, system administrators should specify the performance parameters based on the role that the server will play in the organization, and assign database files to specific drives based on the resources available in their computer. However, such adjustments require the system administrator to know how the performance parameters will be used, and their locations in the server. Further, in order to assign database files to disk drives, the number of database files, the number of disk drives, and knowledge of the disk drive read and write speeds is necessary. Furthermore, when assigning database files to disk drives, the system administrator must ensure that destination directories for storing database files are empty, and that unique directories have been specified for certain sets of files.

Although it is necessary to adjust parameters and to assign various database files and log files to disk drives to obtain optimal server performance, system administrators often cannot do so because of the complex nature and increased number of server hardware and software considerations.

SUMMARY OF THE INVENTION

The invention provides a simple, central tool for a system administrator to use to improve the performance of a computer to be used as a server. One or more disk drives are tested to determine their performance characteristics. In addition, the capacity of the disk drives are determined. Lastly, server files are assigned to specific disk drives based on the tests and the capacities of the drives to enable improved disk drive performance.

Implementations of the technique may include one or more of the following features. The disk drives may be tested substantially simultaneously for sequential write and random-access read and write performance and scored in order of their performance. To perform the testing, a random-access test file may be created, then the random-access test run imitating the database engine, and the average random-access time determined for each disk drive. A sequential test file may also be created, then a sequential test run imitating the database engine, and the average sequential access time determined for each disk drive. The score for a disk drive may be penalized if it contains paging files or is too full, or may be granted a bonus if certain files already reside there. A public store database file, private store database file, information store log files, directory service log files, message transfer agent log files and a directory service database file may be assigned to disk drives depending on the score results and the capacity of the disk drives. An administrator may be prompted to authorize the assignments. In order to store the message transfer agent log files and directory service database file, the program may determine how many drives are available after all of the other files have been assigned, test the remaining drives and assign these files based on the test results. An internet mail connector file may be stored on the same drive as the message transfer agent log files. Lastly, each of the assigned file locations may be saved in a server registry database.

In another aspect, the invention is a technique for improving the performance of a server by automatically calculating server parameters based on the input from an administrator, and assigning server files to disk drives. The disk drives are tested for performance characteristics and storage capacity before files are assigned.

Implementations of this aspect may include one or more of the following features. Server parameters may be set based on calculations. Server data may include the number of users in the organization and the amount of random-access memory available in the server. The server parameter values and file locations may be saved in a server registry database. An optimizer log file may be created and changes made to the server parameters and to the file locations may be recorded there. The server parameter values may be chosen depending on whether the computer is configured as a single server or a multi-server. The total number of buffers required by at least two database engines may be calculated and then allocated between them. The number of buffers may be determined based upon the amount of RAM available and the number of users hosted by the server. The amount of RAM available in the server may be adjusted depending on the role of the server. The buffers may be allocated depending on the role of the server and divided between database engines according to an algorithm. A directory service database engine may be limited to a maximum amount of buffers depending on the number of users in the organization. An administrator may be prompted to authorize the file assignments and calculated parameters before the server characteristics are changed.

BRIEF DESCRIPTION OF THE DRAWINGS

FIG. 3B is a table illustrating the various MTA parameters;

FIG. 3C is a table illustrating the various MDB and DSA parameters;

FIG. 5A is a simplified optimizer menu displaying disk drive assignment results.

DESCRIPTION OF THE PREFERRED EMBODIMENTS

Figure 1:
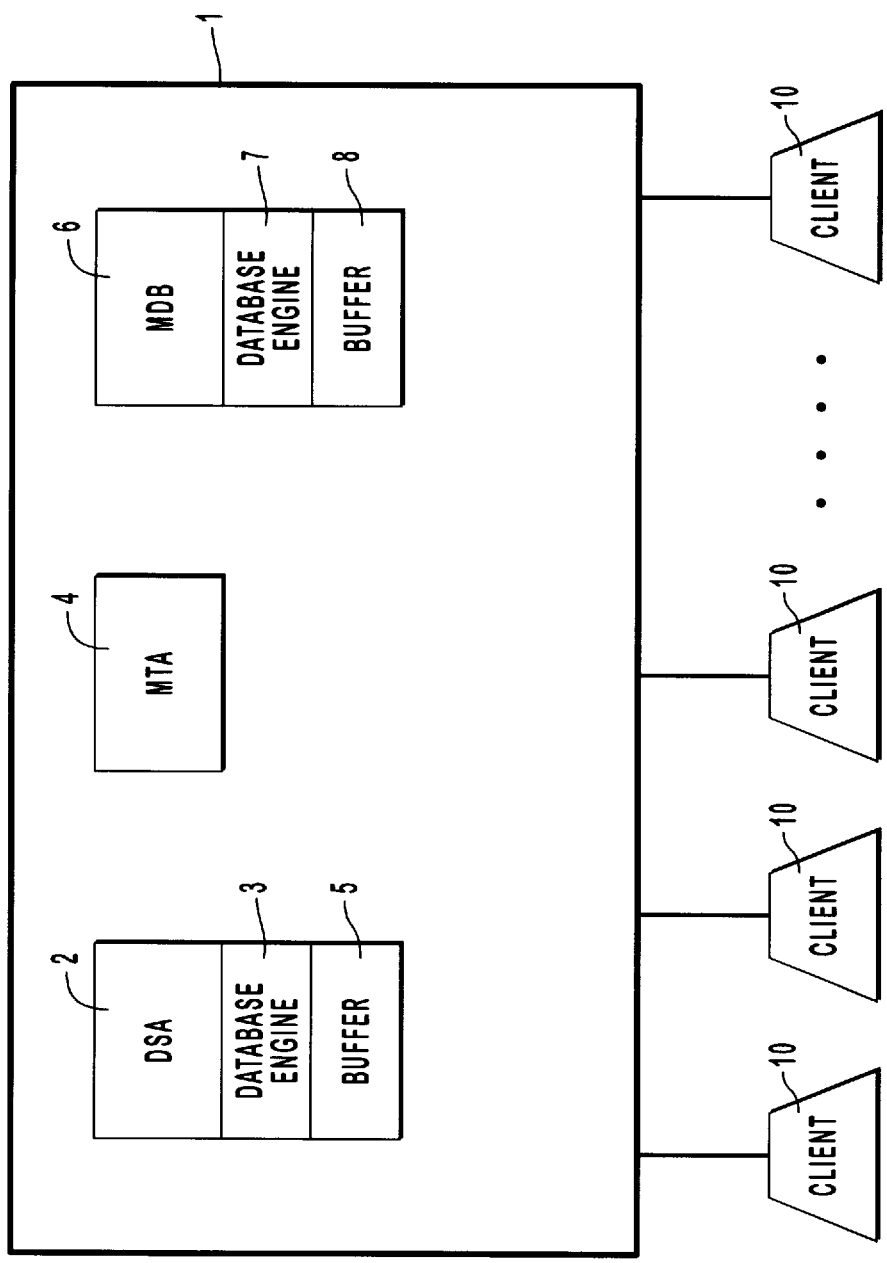
FIG. 1 is a simplified block diagram of a server to illustrate the components of the server.

FIG. 1 is a simplified block diagram of a server 1 that contains a Directory Service (DSA) component 2, a Message Transfer Agent (MTA) component 4, and a Message Database (MDB) component 6. The DSA contains the address book of users for sending mail, and the MTA sends the mail to its destination. The MDB communicates with a plurality of users or clients 10. The DSA and MDB components contain database engines 37 having associated parameters that can be adjusted to increase the performance of the server. Each database engine also reads and writes to various files stored on drives in the server. The MDB has a cache, or random access memory buffer 8, that stores message information that may be accessed by a user. The DSA may also have an associated random access memory buffer 5. In addition, the DSA, MTA and MDB components each have associated performance parameters that are adjustable, and that should be set to certain values depending on the role the server is to play in the system.

After server software has been installed on the server, the system administrator is prompted to run the performance optimizer program. At this time, the DSA, MTA and MDB services are running with their default or unoptimized parameters. When the administrator indicates that the optimizer should execute, the optimizer program shuts down each of the services. A menu containing questions concerning the server is then displayed.

Figures 2, 3A:
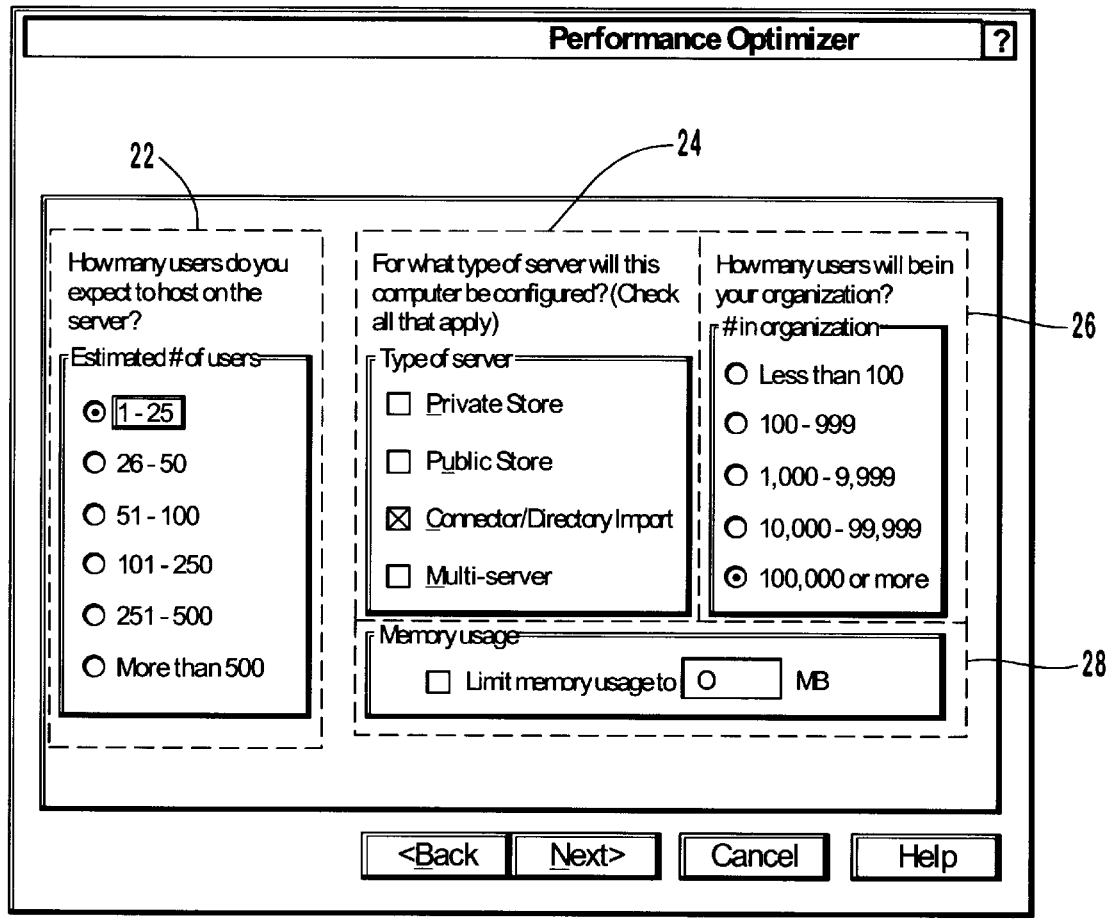
FIG. 2 is a simplified optimizer menu containing server questions displayed for the administrator.
FIG. 3A is a table illustrating the settings for MDB minimum and maximum threads and DSA maximum threads.

FIG. 2 is an example of a simplified optimizer menu 20 displayed on a screen for the system administrator. The optimizer menu 20 contains a series of questions for the administrator to answer regarding the role the server will play in the organization, the number of users that will be serviced, and the amount of RAM she wishes to reserve. In particular, in box 22 the administrator is asked to select the number of users expected to be logged onto the system concurrently. Next, in box 24 the administrator is queried concerning the role of the server, and may select one or more of the following four choices: private store server, public store server, connector server and multi-server. In box 26, the number of users expected to be serviced in the organization, or the number of users expected to appear in a global address book on the server should be entered. Lastly, the system administrator is asked in box 28 to reserve an amount of random access memory (RAM) for the exclusive use of the server. This value should be 24 megabytes (MB) of RAM or more. If this option is set to 0 MB, then the optimizer program is authorized to allocate all of the available RAM on the server for use by the server components.

The performance optimizer uses the data entered by the administrator as input to a plurality of calculation algorithms. The calculation algorithms utilize the data to suggest parameter settings for the DSA, MTA and MDB components to achieve optimal server performance. The critical parameters for each of these components are calculated based on the amount of physical memory available, the number of processors, and the feedback from the administrator. It should be noted that, if the role of the server changes, or if the administrator decides to add users to the server, then the optimizer program can be re-run to recalculate the affected parameters.

Setting the correct number of database engine buffers used by the MDB (private and public) and the DSA is crucial to getting the best performance from the server. For example, if the server will be used as a mail connector (commonly known as a backbone server), then the MTA will serve only as a transfer point for mail. Backbone servers do not store any messages, and thus to achieve optimal performance the size of the MDB buffer should be small. However, if the server will be used as a public mail server, then the size of the MDB buffer should be set adequately large to accommodate the number of users on the system. An MDB buffer that is too large or too small will result in poor server performance, and therefore it is critical to set the correct buffer size. Using the answer given by the administrator in box 28 of FIG. 2, the following "Table I" is used as a basis to determine the total number of database engine buffers required:

TABLE I

| Row | MB of physical RAM | No. of base total buffers |
|-----|--------------------|---------------------------|
| 0   | 16 or less         | 250                       |
| 1   | 17–24              | 700                       |
| 2   | 25–32              | 1000                      |
| 3   | 33–48              | 2500                      |
| 4   | 49–64              | 5000                      |
| 5   | 65 and over        | **see below               |

Referring to Table I, the "Number of base total buffers" column indicates the initial number of total buffers allocated for use by both the MDB and DSA database engine components based on the amount of physical RAM in the server. However, several adjustments may be required in the amount of RAM actually available in order to arrive at the correct total number of buffers that should be assigned. For example, if the server is running on RISC hardware (For example, Alpha, MIPS, or PPC), 4 MB is subtracted from the amount of physical RAM because these architectures require more memory to operate effectively. The resulting number is then used as the amount of physical RAM in the machine from that point on. In addition, the amount of physical RAM is further reduced by 10% if the connector role is chosen and by 5%. if the server configuration includes one or more gateway connections. If both conditions are true, the result is inclusive, so 15% would be subtracted. These adjustments account for the increased resource requirements for these types of configurations. Consequently, before progressing with buffer tuning calculations, the amount of physical RAM specified by the administrator as being available in the computer (in kilobytes) is adjusted by the following equation:

$$RAM_K = RAM - (20 \times cUsers)$$

The variable "cUsers" is the number of users the administrator has chosen to host on this server. The actual total number of buffers is then calculated as follows:

$$cBuf = Buf_{k-1} + \frac{(RAM_k - M_{k-1})}{M_k - M_{k-1}} \times Buf_k - Buf_{k-1}$$

where "M" is the amount of RAM in kilobytes in the server (from Table I, first column and using the second number) and "Buf" is the number of base total buffers (column 2 of Table I). The subscripts "k and "k−1" denote the current row and previous row table values. For the case where 16 MB of RAM is available, and there is no previous row table value, then the base total buffers number from Table I is used as the actual total buffers.

For example, a 64 MB machine hosting 250 users would use the following formula:

$$RAM_K = 65536 - (20 \times 250) = 60536 \text{ kB}$$

In this case, k=4, because 64 MB appears in row four in Table I above. Then, using the above equation for cBuf:

$$cBuf = 2500 + \left( \frac{(60536 - 49152)}{(65536 - 49152)} \right) \times (5000 - 2500) = 4236$$

And this yields 4,236 buffers.

If the server has 65 MB or more of RAM, the total number of buffers is calculated as follows:

$$\left( \frac{RAM_k - 65536}{6.5} \right) + Buf_n$$

In this formula, $Buf_n$ is the last entry of base total buffers in Table I above, which is always 5,000.

For example, if a server contains 128 MB of RAM and hosts 250 users, the total number of buffers would be 14,313. This calculation takes $RAM_k$ into consideration, which is calculated according to the equation described above.

Now that the total number of buffers has been determined, the percentage of buffers for use by the MDB and DSA database engines from this pool will be allocated. This number will vary depending on the server type, and may be calculated using an algorithm. The following Table II provides an example describing this relationship:

TABLE II

| Type of Server | Percentage of buffers allocated to the MDB | Percentage of buffers allocated to the DSA |
| --- | --- | --- |
| Private | 80% | 20% |
| Public Only | 85% | 15% |
| Backbone | 20% | 80% |
| Gateway | 70% | 30% |

If any combination of these server types is chosen, then the resulting percentage is taken as the average of the server type values. For example, if the administrator chose Private, Public, and Gateway server types, the percentage of buffers assigned to the DSA database engine would be:

$$\frac{20 + 15 + 30}{3} = 21\%$$

An additional 10% is added to this result if the administrator indicates that the server is a gateway configuration, or has the private server role included, and the number of organization users is 100,000 or more. This increase in allocated buffers accounts for the more intensive directory service utilization in larger organizations.

However, the DSA is limited to a maximum number of buffers. Thus, if the calculated amount of DSA buffers exceeds a certain maximum value, the maximum value is used instead. The following Table III describes the maximum values used:

TABLE III

| No. of Users in Organization | Maximum No. of DSA Buffers |
| --- | --- |
| up to 100 | 100 |
| 1,000 | 1000 |
| 10,000 | 10000 |
| 100,000 | 100000 |
| More than 100,000 | No Maximum |

Any buffers not consumed because of this maximum are reassigned to the MDB database engine. This ensures the total number of buffers are always allocated.

In summary, first the total number of required buffers to be used is determined, and then their allocation between the DSA and MDB database engines depends upon the server type and number of users in the organization.

The MDB and DSA each include a registry parameter for setting the maximum number of session threads that will be created to service an incoming request. In addition, the MDB also includes a registry parameter for setting a minimum number of threads that exist at any time. FIG. 3A is a table 30 illustrating how these parameters are set based on the number of expected users on the server. In FIG. 3A, the DSA Maximum Threads column is set at 50 for all numbers of users to avoid problems encountered when this value is set too low.

FIG. 3B is a table 32 listing the various MTA parameters and how they are set, which depends on whether the computer is a single server or a multi-server. FIG. 3C is a table 34 listing the various MDB and DSA parameters and their settings. The values for the MDB and DSA buffer parameters in FIG. 3C are calculated depending on the number of users and the role of the server, as described above. The values for the MDB minimum and maximum threads and the DSA maximum threads are shown in the table of FIG. 3A.

After determining how the registry parameters should be tuned, the logical disk drives of the server are analyzed. The optimizer program determines how many disk drives are in the machine, their read and write performance characteristics and their capacity for storing files, as explained below.

The DSA, MTA and MDB components shown in FIG. 1 utilize six separate sets of database engine files which may be located on various disk drives. In particular, the DSA utilizes a random-access database file and sequential log files. The MDB utilizes random-access public database file, random-access private database file, and sequential log files. Lastly, the MTA utilizes sequential log files. In order to improve the performance of the server, these files must reside on the best disk drives available.

Each physical drive on the server is tested to ascertain its performance characteristics for random-access reading and writing of files for database transactions, and for sequential writing of files for logging activity. Consequently, two different disk algorithms are used.

A random-access disk algorithm first creates a 4 megabyte (MB) test file, although the size of the file may be changed if desired. The test file is then used to perform 4 MB worth of random reading and writing of data to the disk drives. The location of the read and write is random, but is sector aligned and will not cause the file to be extended. That is, the last possible location for a read or write will be 4 MB minus the page size. If an error is encountered during a read or write operation, the operation is re-tried. During this test, the behavior of the database engine is imitated as closely as possible. Thus, the same database engine file flags and conventions are used to ensure accurate simulation of the drives for such files.

Each logical drive is tested substantially simultaneously to ensure that physical drives having two or more logical partitions are not scored artificially high. It is not realistic to time each partition separately during testing because, during actual use by the server, the partitions on a physical drive would probably be in use at the same time. Such operation drastically reduces the performance of a partitioned disk drive. Therefore, performing the test simultaneously ensures that partitioned drives will be scored lower than other physical disk drives.

The second disk algorithm tests sequential behavior when writing log files. Log files are written sequentially onto a disk, and are typically used to recover the server should some type of system crash occur. A 4 MB test file (the test file size may be modified) is created having the same flags used by the database engine. Data is written to the test file in the same manner as the database engine to ensure accurate simulation of use of the drives for such files. The test consists of starting a timer before the first write and then stopping the timer when all writes have succeeded. Each write is one page length and a total of 4 MB of writes are performed. All logical disks are tested substantially simultaneously using multiple threads, which permits the easy detection of disks partitioned with two logical drives on the same physical disk.

After the random-access and sequential tests are completed, the average access times for writing and reading large amounts of data are used to generate a score in milliseconds for each disk drive that indicates how well it performed. Table IV, below, lists the score each of four drives in a server achieved after being tested by the random-access and sequential disk algorithms.

TABLE IV

| Drive | Random-Access | Sequential |
|-------|---------------|------------|
| C:    | 3000          | 5000       |
| D:    | 7000          | 5100       |
| E:    | 5500          | 8000       |
| F:    | 6900          | 7700       |

When the drives in Table IV are considered in order to make decisions regarding where certain files should be stored, factors other than disk read and write speed will sometimes play a role. For example, drive C: has the best sequential access time and by far the best random-access time. However, if a particular set of log files should be stored on the best sequential drive, it makes sense to store them on drive D:, the second best sequential drive, rather than on drive C: because it would be more beneficial to use drive C: for a database file that requires the best random-access drive. Other disk drive considerations are discussed in detail below.

Once the disk drives have been tested for performance times, they are then analyzed to determine which drives should be used to store the various server files. There are six sets of server files that must be placed on the disk drives: a Private Information Store (PRV) database file, a Public Information Store (PUB) database file, a Directory Service (DS) Database file, Information Store (IS) Log files, Directory Service Log files and Message Transfer Agent (MTA) Log files. It is preferable to utilize random-access disk drives for the database files, and separate sequential disk drives for the log files, but this may not always be possible.

Figure 4A:
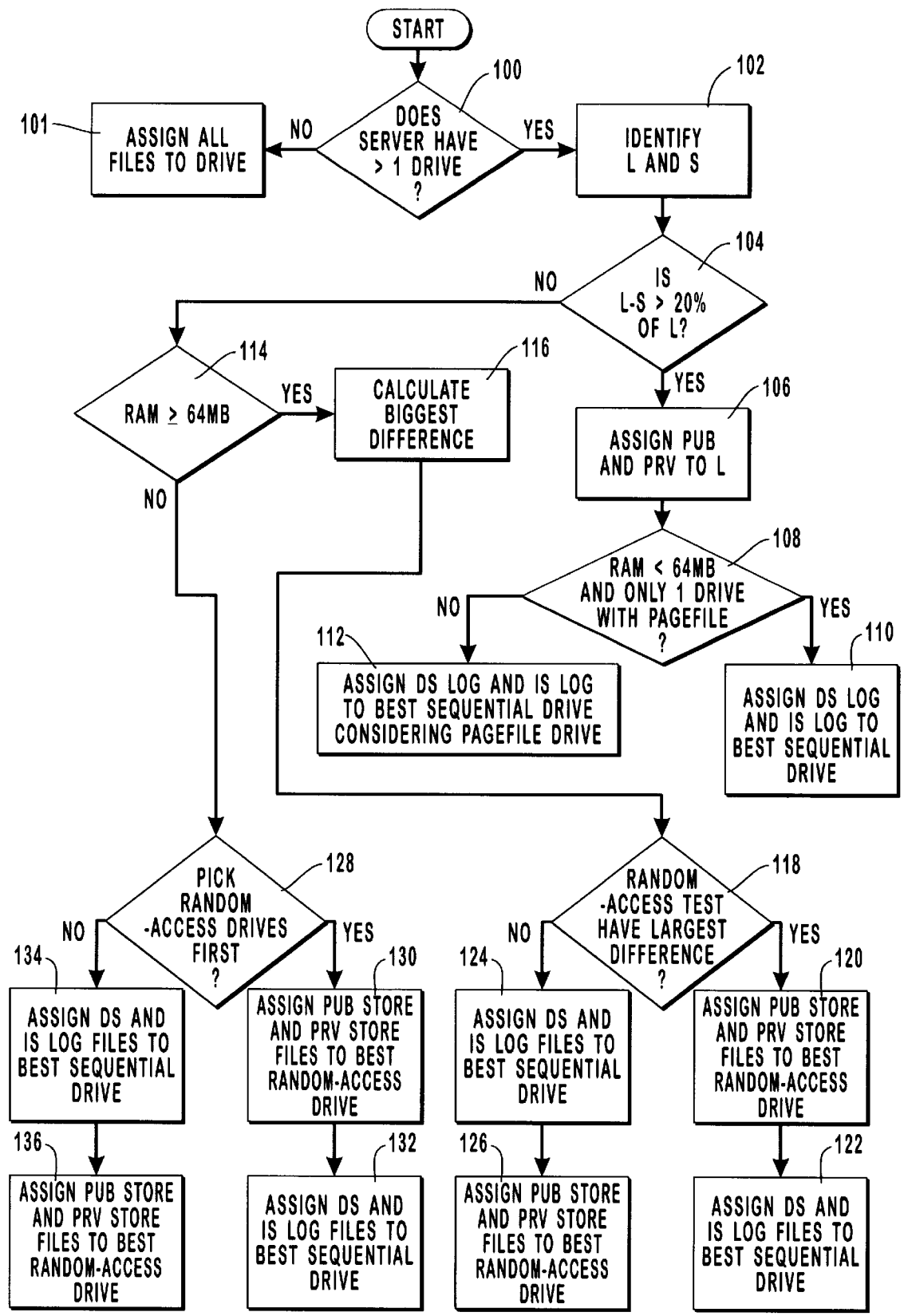
FIG. 4A is a flowchart illustrating the steps involved to assign files to server disk drives.

FIG. 4A is a flowchart illustrating the steps involved to assign the DS log files, the IS log files, the PUB database file and the PRV database file to the disk drives. These files are assigned before assigning the MTA log files and the DS database file. In step 100, if the server has only one drive then in step 101 all of the database and log files are assigned to that drive. If the server has more than one drive, then in step 102 the largest (L) and smallest (S) drives are identified. Next, in step 104, the difference between the largest and smallest drives is determined, and if it is greater than 20% of the largest drive then in step 106 the Public Store database files (PUB) and the Private Store database files (PRV) are assigned to the largest drive. Next, in step 108, if the computer has less than 64 MB of RAM and only one drive with a pagefile on it, in step 110 the best sequential drive is chosen, without considering the pagefile drive, and the Directory Service Log (DS Log) and Information Store Log (IS Log) files are assigned to that best sequential drive.

The best sequential disk drive has the best sequential access timing score (lowest time), and meets all of the following criteria. First, the drive must not have been excluded from consideration by the administrator or because it is too full. Second, a set of files has not already been assigned to it. Lastly, the best sequential disk drive does not contain a pagefile, or does but otherwise scored better than other drives that also contain pagefiles. A second best sequential disk drive meets the same criteria, but the first choice is discarded in favor of the second choice.

Again referring to FIG. 4A, in step 108 if the server computer has more than 64 MB of RAM, then in step 112, the best sequential disk drive other than the pagefile drive is chosen, and the Directory Service (DS) Logs and Information Store (IS) Logs are assigned to that best sequential drive.

Referring now to step 104 of FIG. 4A, if the difference between the largest disk drive and smallest disk drive is less than 20% of the largest drive, then in step 114 it is determined if the amount of RAM is greater than or equal to 64 MB. If so, in step 116, the biggest difference between the two best random-access drive times and two best sequential drive times are calculated. If the difference between the two best sequential times is greater than or equal to the difference between the two best random-access times then the sequential test is deemed to have the biggest difference in performance time. Otherwise the random-access test has the biggest difference in performance time. Thus, in step 118, if the result is that the random-access tests showed the larger difference in timings of the various drives, then the Public Store (PUB) and Private Store (PRV) database files should be assigned first to the best random drive. Thus, in step 120 the best random-access disk drive, other than the pagefile drive, is chosen and the Private and Public Store files are assigned to that drive.

The best random-access disk drive has the best random-access timing score (lowest time), and meets all of the following criteria. First, the drive has not been excluded from consideration by the administrator or because it is too full. Second, a set of files has not been already assigned to it. Lastly, the best random-access disk drive does not contain a pagefile, or does but otherwise scored better than other random-access drives having pagefiles. A second best random-access disk drive meets the same criteria but the first choice is discarded in favor of the second choice.

Again referring to FIG. 4A, in step 122, the DS and IS Log files are assigned to the best sequential disk drive, other than the drive containing the pagefile. If, in step 118, the sequential test showed the biggest difference, then the DS and IS log files should be assigned to the best sequential drive first. Thus, in step 124, the DS and IS Log files are assigned to the best sequential disk drive, other than the drive containing the pagefile. Then, in step 126 the private store (PRV) and public store (PUB) files are assigned to the best random-access drive, other than the drive containing the pagefile. (Note that files are assigned in a different order in steps 124 and 126 than in steps 120 and 122). However, if in step 114, the amount of RAM is less than 64 MB, then in step 128, a decision is made whether or not to pick a random-access drive first.

The random-access drives are picked first if only one of the tested disk drives contains a pagefile. If that is not true, then a random-access time difference between the best and second best random-access tests is calculated without considering the pagefile, and a sequential time difference between the best and second best sequential tests is calculated without considering the pagefile. If the random-access time difference is greater than or equal to the sequential time difference, then the random-access drives are chosen first. If not, the sequential drives are chosen first.

If the best random-access drive should be chosen first, then in step 130 the Private Store and Public Store files are assigned to that drive. Next, in step 132, the DS and IS Log files are assigned to the best sequential drive. However, if in step 128 the answer is "NO", then it is better to assign the sequential access files first. Thus, in step 134, the DS Log and IS Log files are assigned to the best sequential drive, ignoring the pagefile drive. Then, in step 136, the Private and Public Store files are assigned to the best random-access drive, ignoring the pagefile drive.

After the four sets of files discussed above have been assigned to disk drives, the MTA log files and DS database file are assigned. Ideally, each of the files will be put on their own drives to avoid having to read or write two or more database files or log files to the same drive at the same time.

Figure 4B:
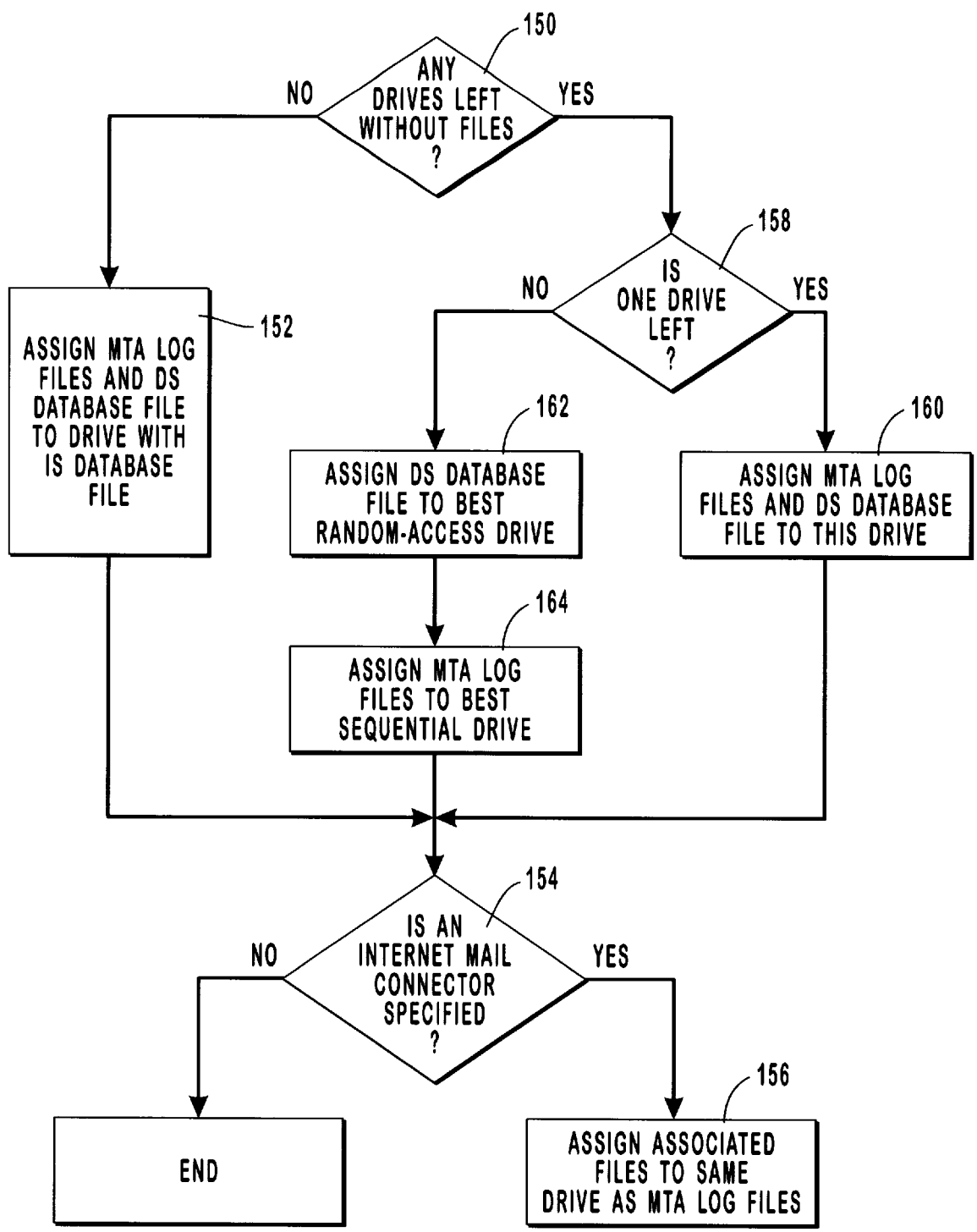
FIG. 4B is another flowchart illustrating the steps involved to assign other files to server disk drives.

FIG. 4B is a flowchart illustrating the steps used to assign the MTA log files and DS database file. In step 150, it is determined whether or not there are any drives left in the server without any file assignments. If not, in step 152 the MTA log files and DS database file are assigned to the same drive as the Information Store database file. Next, in step 154, the server is checked to see if an internet mail connector has been specified. If so, in step 156, all files associated with the internet mail connector are moved to the same drive as the MTA log files.

Referring again to step 150 in FIG. 4B, if at least one drive without file assignments is available the routine moves to step 158 which asks if only one drive is left. If so, in step 160 the MTA log files and DS database file are assigned to that drive. The routine then again progresses to step 154 and to step 156 if an internet mail connector was specified. However, in step 158 if more than one drive is present, then in step 162 the DS database file is assigned to the best remaining random-access drive, and in step 164 the MTA log files are assigned to the best remaining sequential drive. Again, after the assignments in steps 162 and 164, the routine progresses to step 154 and to step 156 if an internet mail connector was specified.

It should be noted that some files that already exist on a particular disk drive may not be moved, even though a slight performance enhancement could be achieved by moving them to a faster drive. There are two reasons for operating in this manner. First, it has been observed that it is sometimes costly to move database files, and thus that such changes should occur only if there is a significant performance improvement. Second, some administrators will frequently rerun the optimizer program whenever minor changes occur to recalculate server parameters, and it is beneficial in such circumstances to prevent database files from continually being moved between drives in order to achieve only minor performance improvements.

After all of the parameters and file locations have been determined, the optimizer program may prompt the user for authorization to store the data files in the recommended drives, and to authorize changing the server parameters. Alternately, files could be moved and parameters changed automatically without requesting authorization.

Figure 5B:
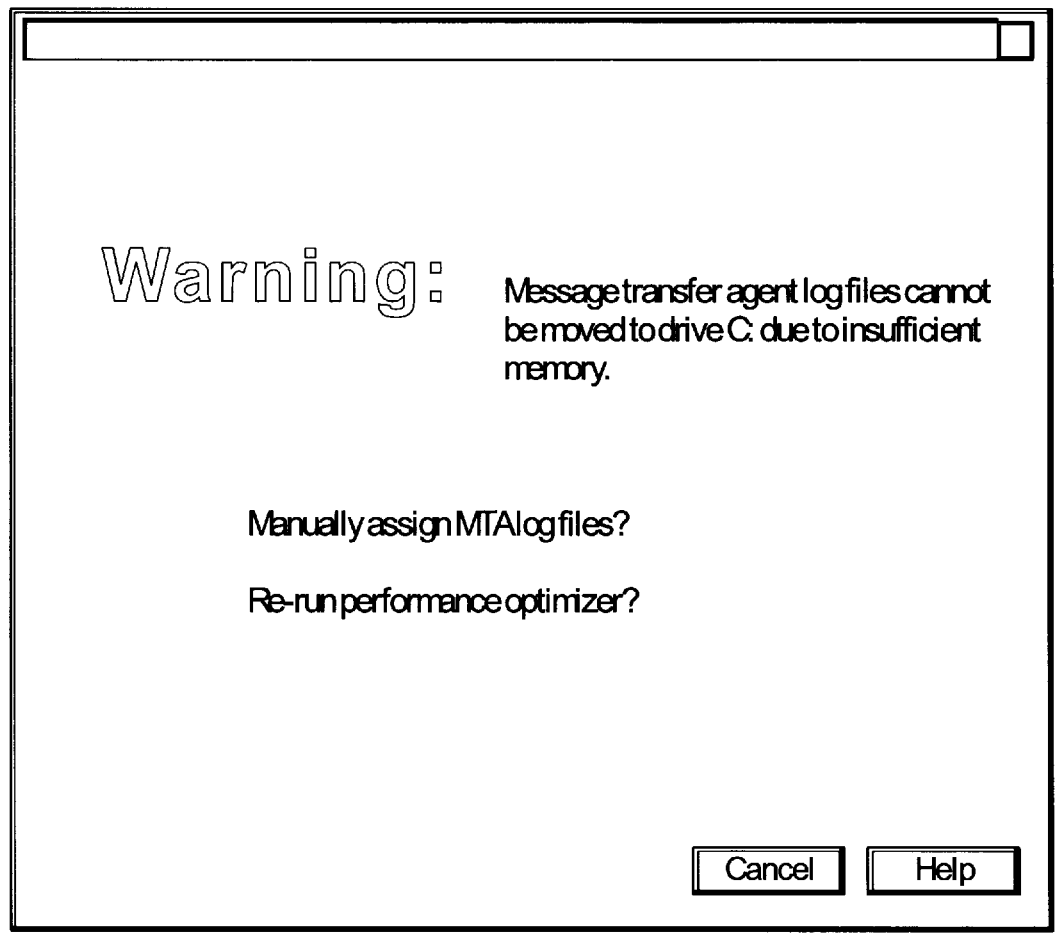
FIG. 5B is an example of a warning message displayed when a problem arises with a disk drive assignment.

FIG. 5A is an example of a display presented to the administrator after the optimizer program has analyzed the disk drives. The display lists where the various files currently reside and provides recommendations for moving the files to improve server performance. The results reflect the hardware configuration of the server as well as the role the server will play in the client/server organization. The administrator may then hit the "Yes" key to verify that the files should be assigned and moved to the suggested drives, or indicate that she wishes to manually reassign the drives. Alternately, the administrator may cancel all of the proposed changes in favor of continuing with the configuration that existed before the optimizer program executed. If the suggested changes are accepted, the optimizer program moves the files and updates the server parameters. If a set of files cannot be moved because of insufficient disk space or other file errors, the performance optimizer will move the rest of the files and alert the system administrator, as shown in the example warning message display of FIG. 5B. Regarding FIG. 5B, the administrator may manually assign the MTA log files to a drive other than drive C:, or re-run the optimizer program with the instruction to exclude drive C: from consideration.

In addition to moving the files to the recommended drives and loading the new server parameters, the optimizer program may save file location data and parameter change data into a server registry. A performance optimizer log file may also be created to keep track of all of the changes made to the server, and to report problems. Each time the optimizer program is run for this server the latest log entries are appended to this file. After the changed parameters are loaded and the files moved to their drives, all of the server services are restarted and will now be running in their optimal configurations.

The performance optimizer program incorporates the experience and knowledge of a team of experts who developed and understand the server software. The optimizer program thus addresses the issues that affect the performance of the server, and is a tool that an administrator can use to easily configure the server.

Other embodiments of the invention are within the following claims. For example, fewer than all of the disk drives resident on a server may be tested as part of the optimization. The optimization may achieve less than optimal performance.

What is claimed is:

1. In a client server environment where a server computer may be configured to act as any of a plurality of server types, and where the performance of the server computer when acting as any of the server types is determined by various server configuration parameters that can be adjusted to optimize operation for a given server type, a method for configuring the server computer including (1) automatically calculating configuration parameters that are optimized to the specific server types supported by the server computer to improve performance over using a default set of configuration parameters for all server types and (2) placing files used by the server computer on disks that will further increase overall server performance, the method comprising the steps of:

querying an administrator for server data, comprising any of the number of users that are expected to be connected to the server, the number of users in the entire organization, the amount of memory specifically allocated for server use, and the particular server types that are to be supported by the server;

determining from said server data provided by the administrator and from hardware information obtained directly from the server various server configuration parameters that can be adjusted to optimize operation for the particular server types that are to be supported by the server by performing at least the steps of:

calculating a total number of database buffers to be used by at least one software component on the server: and calculating a number of execution threads that can be simultaneously executed by at least one software component on the server;

testing the read and write performance of a plurality of disk drives in order to determine the disk drives that are best suited to store various files used by the server in supporting the server types designated by said administrator;

determining the capacities of the disk drives: and assigning the server files to specific disk drives based on the results of the read and write performance testing, the storage capacities of the disk drives, and the amount of memory in the server.

2. The method of claim 1, further comprising the step of saving the server configuration parameters and file locations in a server registry database.

3. The method of claim 1, further comprising the steps of: creating an optimizer log file; and recording changes made to the server configuration parameters and to the server database and log file locations in the optimizer log file.

4. The method of claim 1, wherein the step of determining server configuration parameters comprises the step of choosing certain preset parameters based on whether the computer is configured as a single server or a multi-server.

5. The method of claim 1, wherein the step of determining server parameters comprises the steps of:

calculating the total number of buffers required by at least two server database engines: and allocating the buffers between the database engines.

6. The method of claim 5, wherein the step of calculating the total number of buffers comprises the steps of:

determining a RAM value in kilobytes corresponding to the amount of available random-access memory in the server;

determining the number of users hosted by the server; and using the RAM value and the number of users to determine the total number of buffers required by the server.

7. The method of claim 6, wherein the amount of RAM is adjusted depending on the role of the server.

8. The method of claim 5, wherein the allocating step comprises the steps of:

determining the role of the server: and dividing the buffers between the database engines according to an algorithm.

9. The method of claim 5, wherein a directory service database engine is limited to a maximum amount of buffers depending on the number of users in the organization.

10. The method of claim 1, wherein the assigning step further comprises the step of prompting the administrator to authorize the file assignments and the calculated parameters.

11. In a client server environment where a server computer may be configured to act as any of a plurality of server types, and where the performance of the server computer when acting as any of the server types is determined by various server configuration parameters that can he adjusted to optimize operation for a given server type, a computer program product for configuring the server computer including (1) automatically calculating configuration parameters that are optimized to the specific server types supported by the server computer and (2) placing files used by the server computer on disks that will further increase overall server performance comprising:

a computer readable medium having computer executable instructions embodied thereon comprising:

means for querying an administrator for server data comprising any of the number of users that are expected to be connected to the server the number of users in the organization, the amount of memory allocated for server use and the particular server types that are to be supported by the server;

means for determining from at least said server data provided by the administrator various server configuration parameters that can be adjusted to optimize operation for the particular server types that are to he supported by the server comprising:

means for calculating a total number of database buffers to be used by at least one software component on the server; and means for calculating a number of execution threads that can be simultaneously executed by at least one software component on the server;

means for testing the read and write performance of a plurality of disk drives in order to determine the disk drives that are best suited to store various files used by the server in supporting the server types designated by the administrator;

means for determining the capacities the disk drives; and means for assigning the server files to specific disk drives based on the results of the read and write performance testing and storage capacities of the disk drives.

12. The computer program product of claim 11, further comprising means for saving the server configuration parameters and file locations in a server registry database.

13. The computer program product of claim 11, further comprising:

means for creating an optimizer log file; and means for recording changes made to the server configuration parameters and to the server database and log file locations in the optimizer log file.

14. The computer program product of claim 11, wherein the means for determining server configuration parameters comprises means for choosing certain preset parameters based on whether the computer is configured as a single server or a multi-server.

15. The computer program product of claim 11, wherein the means for determining server configuration parameters comprises:

means for calculating the total number of buffers required by at least two server database engines: and means for allocating the buffers between the database engines.

16. The computer program product of claim 15, wherein the means for calculating the numbers of buffers comprises:

means for determining a RAM value in kilobytes corresponding to the amount of available random-access memory in the server;

means for determining the number of users hosted by the server; and means for using the RAM value and the number of users to determine the total number of buffers required by the server.

17. The computer program product of claim 16, wherein the amount of RAM is adjusted depending on the role of the server.

18. The computer program product of claim 15, wherein the means for allocating buffers comprises:

means for determining the role of the server; and means for dividing the buffers between the database engines according to an algorithm.

19. The computer program product or claim 15, wherein a directory service database engine is limited to a maximum amount of buffers depending on the number of users in the organization.

20. The computer program product of claim 11, wherein the means for assigning further comprises means for prompting the administrator to authorize the file assignments and the calculated parameters.

* * * * *

UNITED STATES PATENT AND TRADEMARK OFFICE
CERTIFICATE OF CORRECTION

PATENT NO. : 5,819,030
DATED : Oct. 6, 1998
INVENTOR(S) : Chen et al.

It is certified that error appears in the above-identified patent and that said Letters Patent is hereby corrected as shown below:

Col. 3, line 43, after "engines" change "37" to --3,7--

Col. 4, line 13, after "be" change "24" to --24-- (not bold type)

Col. 5, line 4, after "5%" delete the period

Col. 12, line 41, after "can" change "he" to --be--

Col. 12, line 53, after "server" insert a comma

Col. 12, line 55, after "use" insert a comma

Col. 12, line 61, after "to" change "he" to --be--

Col. 13, line 6, after "capacities" insert --of--

Signed and Sealed this

Twenty-first Day of December, 1999

*Attest:*

Q. TODD DICKINSON

*Attesting Officer*      *Acting Commissioner of Patents and Trademarks*